(12) United States Patent
Shoa Hassani Lashdan et al.

(10) Patent No.: US 10,600,157 B2
(45) Date of Patent: Mar. 24, 2020

(54) MOTION BLUR SIMULATION

(71) Applicant: QUALCOMM Incorporated, San Diego, CA (US)

(72) Inventors: Alireza Shoa Hassani Lashdan, Burlington (CA); Adrian Leung, Richmond Hill (CA); Evgenii Krasnikov, Etobicoke (CA)

(73) Assignee: QUALCOMM Incorporated, San Diego, CA (US)

( * ) Notice: Subject to any disclaimer, the term of this patent is extended or adjusted under 35 U.S.C. 154(b) by 188 days.

(21) Appl. No.: 15/863,499

(22) Filed: Jan. 5, 2018

(65) Prior Publication Data

US 2019/0213712 A1    Jul. 11, 2019

(51) Int. Cl.
*G06K 9/00*  (2006.01)
*G06T 5/00*  (2006.01)
(Continued)

(52) U.S. Cl.
CPC ............. *G06T 5/002* (2013.01); *G06T 5/50* (2013.01); *G06T 7/20* (2013.01); *G06T 7/248* (2017.01); *G06T 7/30* (2017.01); *H04N 5/2621* (2013.01); *G06T 2200/24* (2013.01); *G06T 2207/10016* (2013.01); *G06T 2207/20092* (2013.01);
(Continued)

(58) Field of Classification Search
CPC ...... G06F 3/011; G06F 3/0304; G06F 3/0346; A63F 13/213; A63F 13/24; A63F 13/426; A63F 13/248; A63F 13/655; A63F 13/00; A63F 13/428; G06T 7/73; G06T 5/002; G06T 5/50; G06T 7/20; G06T 7/30; G06T 7/174; G06T 7/181; G06T 7/246; G06T 7/248; G06T 7/254; G06T 2207/20092; G06T 2207/20201; G06T 2207/20221; G06K 9/00221; G06K 9/00335; G06K 9/00369; G08C 17/00; G08C 17/02; H04N 5/2226; H04N 5/2625
See application file for complete search history.

(56) References Cited

U.S. PATENT DOCUMENTS 8,963,949 B2 * 2/2015 Forutanpour ............. G06T 5/50
                                                345/611
9,396,385 B2 * 7/2016 Bentley ..................... G06T 7/20
(Continued)

FOREIGN PATENT DOCUMENTS

EP    2242021 A1    10/2010
WO    2009029483 A1   3/2009
WO    2016164166 A1  10/2016

OTHER PUBLICATIONS

International Search Report and Written Opinion—PCT/US2018/066490—ISA/EPO—dated Apr. 12, 2019.

*Primary Examiner* — Duy M Dang
(74) *Attorney, Agent, or Firm* — Pamela K. Soggu

(57) ABSTRACT

Methods, devices, and systems for simulating motion blur are disclosed. In some aspects, a device includes a memory and one or more processors coupled to the memory. The one or more processors may be configured to receive a plurality of frames, identify an object of interest within the plurality of frames, track the object of interest within the plurality of frames, align the object of interest within the plurality of frames, and generate a final frame based on blending the aligned plurality of frames.

30 Claims, 14 Drawing Sheets

(51) Int. Cl.
  *G06T 5/50* (2006.01)
  *G06T 7/20* (2017.01)
  *G06T 7/30* (2017.01)
  *G06T 7/246* (2017.01)
  *H04N 5/262* (2006.01)

(52) U.S. Cl.
  CPC .............. *G06T 2207/20201* (2013.01); *G06T 2207/20216* (2013.01); *G06T 2207/20221* (2013.01); *G06T 2207/30196* (2013.01); *G06T 2207/30221* (2013.01); *G06T 2207/30241* (2013.01); *G06T 2210/12* (2013.01)

(56) References Cited

U.S. PATENT DOCUMENTS

| | | |
|---|---|---|
| 2006/0062433 A1 | 3/2006 | Ikeda |
| 2010/0208944 A1 | 8/2010 | Fukunishi |
| 2015/0030246 A1 | 1/2015 | Wilensky et al. |
| 2015/0262341 A1 | 9/2015 | Nash et al. |
| 2016/0028967 A1 | 1/2016 | Sezer et al. |

* cited by examiner

MOTION BLUR SIMULATION

TECHNICAL FIELD

This disclosure generally relates to generating an image including simulated motion blur using multiple frames including a moving object.

BACKGROUND

A panning image is an image of an object in motion. The object may include any object of interest within a scene captured by an image capture device. Within a panning image, the object may be sharp while the background of the scene (for example, aspects of the scene other than the object) may be blurry. The blur may create a visual effect of motion in the panning image. Panning images are typically taken by experienced photographers. Capturing a panning image often requires that the photographer follow the speed of the moving object accurately with the camera. Capturing a panning image also often requires adjusting camera settings. For example, a panning image may be taken by reducing shutter speed. In such a situation, it may be difficult to determine or estimate exposure time. As another example, a panning image may be taken by moving the image capture device in the same direction of motion as the object. However, such a panning image would require steady hands or a tripod to track the object. Also, the movement rate and direction of motion of the image capture device would have to be controlled to match that of the moving object or the panning image may be excessively blurred.

SUMMARY OF THE INVENTION

Aspects of the present disclosure are directed to methods and devices for generating an image including simulated motion blur. In one aspect a device includes a memory and one or more processors coupled to the memory. The one or more processors may be configured to receive a plurality of frames. The one or more processors may also be configured to identify an object of interest within the plurality of frames. The one or more processors may also be configured to track the object of interest within the plurality of frames. The one or more processors may also be configured to align the object of interest within the plurality of frames. The one or more processors may also be configured to generate a final frame based on blending the aligned plurality of frames.

In some aspects, the one or more processors may be further configured to generate one or more new frames based on frame interpolation of the aligned plurality of frames. Blending the aligned plurality of frames may include blending the one or more new frames and the aligned plurality of frames.

In some aspects, tracking the object of interest within the plurality of frames may include determining motion of the object of interest within the plurality of frames. Determining motion of the object of interest may include determining whether the motion of the object of interest includes one or more of translational motion and non-translational motion. Aligning the object of interest within the plurality frames may include aligning one or more frames based on whether the motion of the object of interest includes one or more of translational motion and non-translational motion.

In some aspects, aligning the object of interest within the plurality of frames may include aligning a bounding box surrounding the object of interest within the plurality of frames.

In some aspects, the one or more processors may be further configured to display a user selectable motion blur range to allow a user to select an amount of motion blur to simulate. In some aspects, the one or more processors may be further configured to receive a selection of the amount of motion blur to simulate.

In some aspects, the one or more processors may be further configured to generate a final video by generating a plurality of successive final frames.

In another aspect, a method is disclosed. The method may include receiving a plurality of frames, identifying an object of interest within the plurality of frames, tracking the object of interest within the plurality of frames, aligning the object of interest within the plurality of frames, and generating a final frame based on blending the aligned plurality of frames.

In yet another aspect, a non-transitory computer-readable storage medium is disclosed. The non-transitory computer-readable storage medium may store instructions thereon that, when executed, cause one or more processors to receive a plurality of frames, identify an object of interest within the plurality of frames, track the object of interest within the plurality of frames, align the object of interest within the plurality of frames, and generate a final frame based on blending the aligned plurality of frames.

In a further aspect, a device is disclosed. The device may include means for receiving a plurality of frames. The device may also include means for identifying an object of interest within the plurality of frames. The device may also include means for tracking the object of interest within the plurality of frames. The device may also include means for aligning the object of interest within the plurality of frames. The device may further include means for generating a final frame based on blending the aligned plurality of frames.

The details of one or more examples are set forth in the accompanying drawings and the description below. Other features, objects, and advantages will be apparent from the description, drawings, and claims.

DETAILED DESCRIPTION

Figure 1:
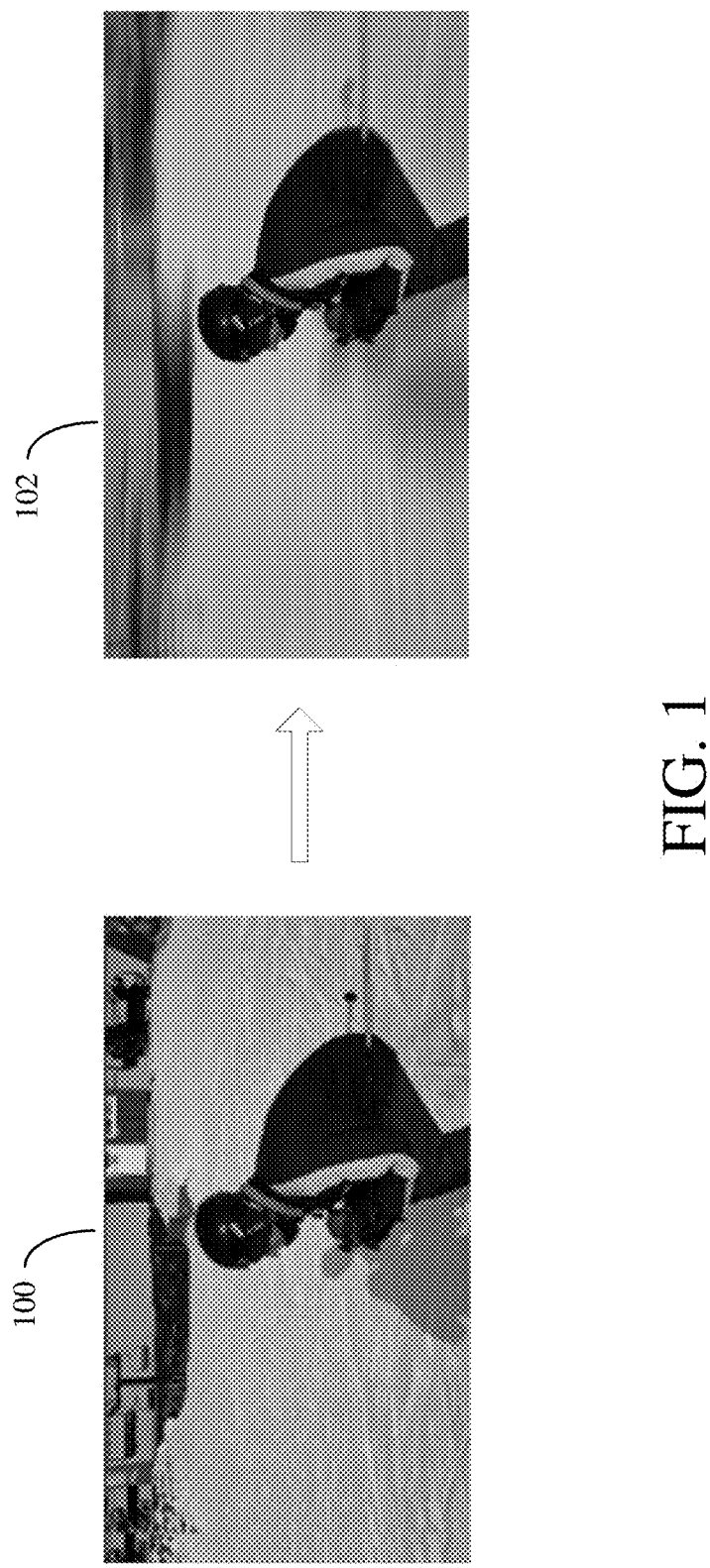
FIG. 1 depicts an example image and an example image with motion blur.

In the following description, numerous specific details are set forth such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well-known circuits and devices are shown in block diagram form to avoid obscuring teachings of the present disclosure. Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

All of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "causing," "accessing," "receiving," "sending," "using," "selecting," "determining," "normalizing," "multiplying," "averaging," "monitoring," "comparing," "applying," "updating," "measuring," "deriving," "estimating" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory, equivalents thereof, and the like.

Aspects of the present disclosure are applicable to any suitable device (such as smartphones, tablets, laptop computers, digital cameras, web cameras, a security system, automobiles, drones, aircraft, and so on) having or coupled to one or more cameras. For multiple cameras, the cameras may include a primary camera and one or more auxiliary cameras with similar capabilities as the primary camera. For example, a device may include a dual camera module with two cameras. The camera(s) may be able to capture and process still images or video. While described below with respect to capturing and processing images, aspects of the present disclosure are applicable to capturing and processing video, and are therefore not limited to still images.

FIG. 1 depicts an example image (e.g. a frame) 100 and an example image (e.g., a frame) 102 including motion blur. Frame 102 appears to have been generated using a manual panning technique, for example, by moving the camera such that an object in the field of view (FOV) (e.g., the skier in frames 100, 102) of the camera remains at approximately the same location in the FOV, producing an image with a sharp object (e.g., the skier) and a blurred background. As shown in frame 102, the ground (e.g., the snow) and the background (e.g., the ski lift and structure) appear blurry while the skier appears sharp.

Aspects of this disclosure, as will be described in further detail below, may include simulating a panning image (e.g., simulating motion blur) without having to follow (e.g., pan) the moving object with a camera at the same speed as the moving object and/or capturing the moving object with a long exposure time. Aspects of this disclosure include obtaining (e.g., receiving) two or more frames including a moving object. The frames may include a video or a portion of a video. The moving object may be tracked within the frames. Based on movement of the object throughout the frames, the frames may be aligned (e.g., shifted) such that the object may appear in the same location within each of the aligned frames. A final image including simulated motion blur may be generated based on blending (e.g., averaging) the aligned frames.

Figure 2A:
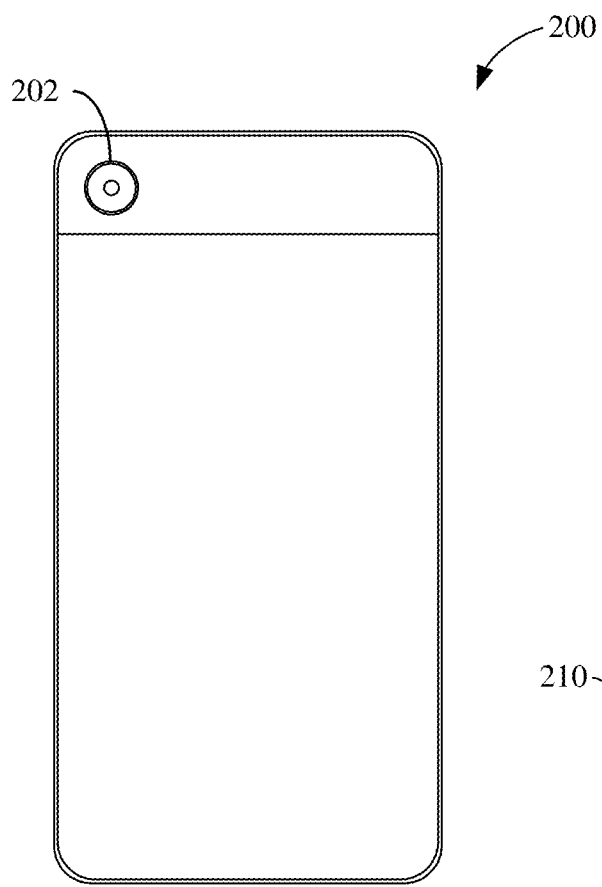
FIGS. 2A-2B depict examples of devices including a camera.
Figure 2B:
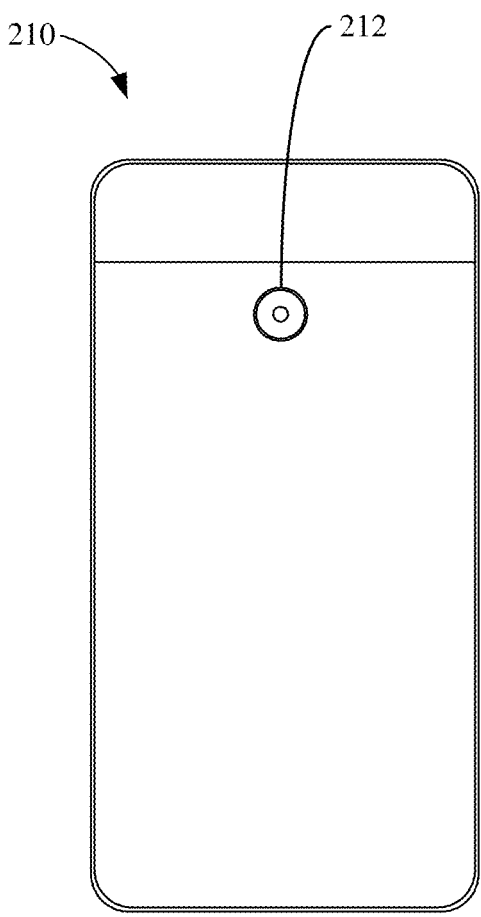
Figure 3A:
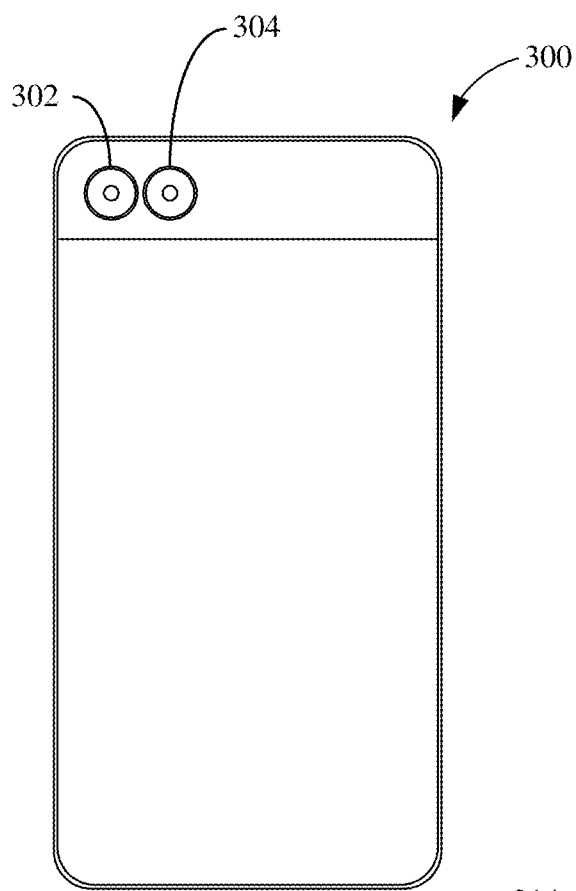
FIGS. 3A-3B depict examples of devices including multiple cameras.
Figure 3B:
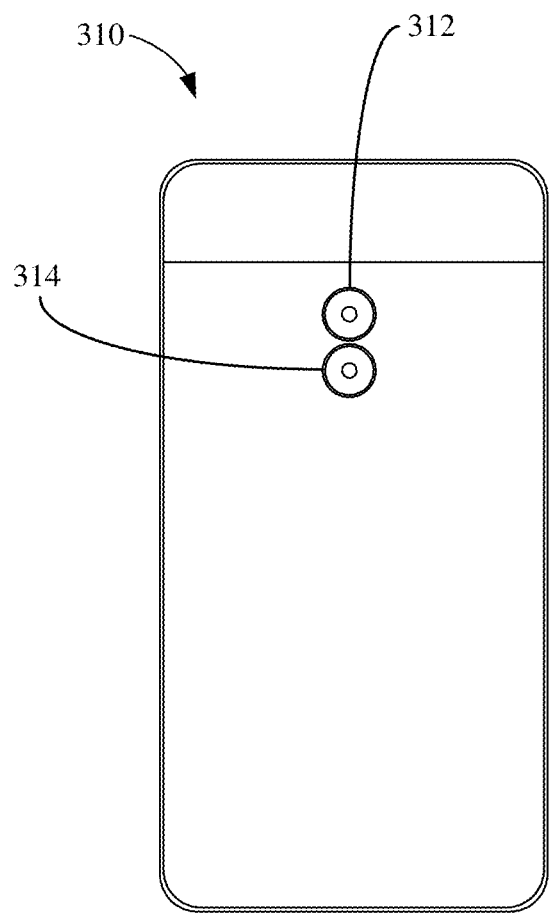

FIG. 2A depicts an example device 200 including a camera 202 arranged in a first configuration, and FIG. 2B depicts an example device 210 including a camera 212 arranged in a second configuration. FIG. 3A depicts an example device 300 including a dual camera with a first camera 302 and a second camera 304 arranged in a first configuration, and FIG. 3B depicts an example device 310 including a dual camera with a first camera 312 and a second camera 314 arranged in a second configuration. In some aspects, one of the cameras (such as the first cameras 302 and 312 of respective devices 300 and 310) may be a primary camera, and the other of the cameras (such as the second cameras 304 and 314 respective devices 300 and 310) may be an auxiliary camera. The second cameras 304 and 314 may have the same characteristics and capabilities (such as the same focal length, same capture rate, same resolution, same color palette, and the same field of view or capture) as the first cameras 302 and 312, respectively. Alternatively, the second cameras 304 and 314 may have different characteristics and abilities than the first cameras 302 and 312, respectively. Although the first cameras 302, 312 and second cameras 304, 314 are depicted in FIGS. 3A and 3B as being disposed on a common side of example devices 300 and 310, it will be understood that in some implementations a first camera can be disposed so as to face a different direction than a second camera. Thus, techniques and aspects disclosed herein can be implemented using a front facing camera and a rear facing camera. Similarly, the techniques and aspects disclosed herein can be applied in devices having other camera configurations, for example, 360 degree capture devices having at least one camera with a field-of-view that at least partially overlaps or at least abuts a field-of-view of a second camera. Any configuration of cameras may be used, and the disclosure should not be limited to the illustrated examples in FIGS. 2A, 2B, 3A, and 3B.

The term "device" is not limited to one or a specific number of physical objects (such as one smartphone). As used herein, a device may be any electronic device with multiple parts that may implement at least some portions of this disclosure. In one example, a device may be a video security system including one or more hubs and one or more separate cameras. In another example, a device may be a computer. In another example, a device may be a smartphone including two cameras such as, for example, the example devices 300 and 310 of FIGS. 3A and 3B, respectively. While the below description and examples use the term "device" to describe various aspects of this disclosure, the term "device" is not limited to a specific configuration, type, or number of objects.

Figure 4:
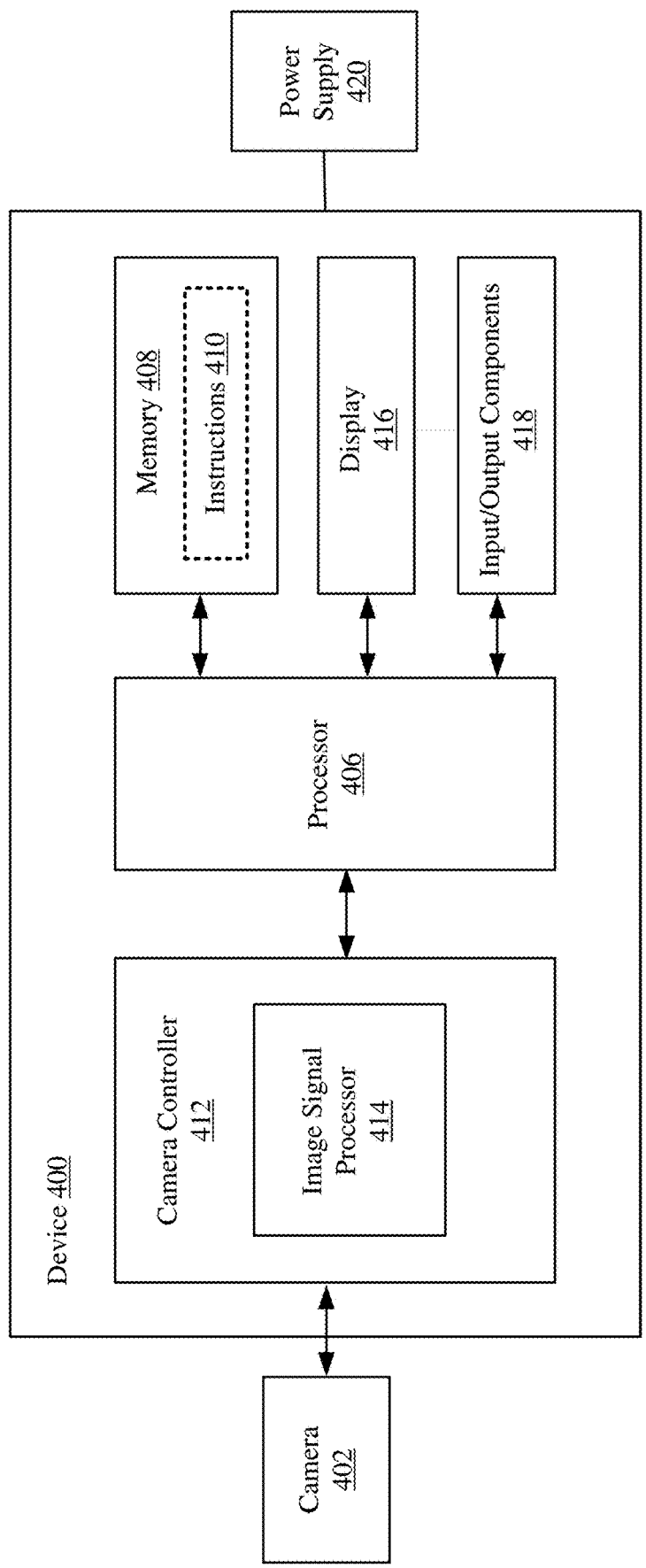
FIG. 4 is a block diagram of an example device for simulating motion blur.

FIG. 4 is a block diagram of an example device 400 that may be used to generate an image that appears to have been generated using a manual panning technique, for example, by moving the camera such that an object in the field of view (FOV) of the camera remains at approximately the same location in the FOV, producing an image with a sharp object and a blurred background. Device 400 may include or may be coupled to a camera 402, and may further include a processor 406, a memory 408 storing instructions 410, a camera controller 412, a display 416, and a number of input/output (I/O) components 418. The example device 400 may be any suitable device capable of capturing and/or storing images or video including, for example, wired and wireless communication devices (such as camera phones, smartphones, tablets, security systems, dash cameras, laptop computers, desktop computers, automobiles, drones, aircraft, and so on), digital cameras (including still cameras, video cameras, and so on), or any other suitable device. The device 400 may include additional features or components not shown. For example, a wireless interface, which may include a number of transceivers and a baseband processor, may be included for a wireless communication device. Device 400 may include or may be coupled to additional cameras other than the camera 402. The disclosure should not be limited to any specific examples or illustrations, including the example device 400.

Camera 402 may be capable of capturing individual image frames (such as still images) and/or capturing video (such as a succession of captured image frames). Camera 402 may include one or more image sensors (not shown for simplicity) and shutters for capturing an image frame and providing the captured image frame to camera controller 412. Although a single camera 402 is shown, any number of cameras or camera components may be included and/or coupled to device 400 (such as FIGS. 3A and 3B). For example, the number of cameras may be increased to achieve greater depth determining capabilities or better resolution for a given FOV.

Memory 408 may be a non-transient or non-transitory computer readable medium storing computer-executable instructions 410 to perform all or a portion of one or more operations described in this disclosure. Device 400 may also include a power supply 420, which may be coupled to or integrated into the device 400.

Processor 406 may be one or more suitable processors capable of executing scripts or instructions of one or more software programs (such as the instructions 410) stored within memory 408. In some aspects, processor 406 may be one or more general purpose processors that execute instructions 410 to cause device 400 to perform any number of functions or operations. In additional or alternative aspects, processor 406 may include integrated circuits or other hardware to perform functions or operations without the use of software. While shown to be coupled to each other via processor 406 in the example of FIG. 4, processor 406, memory 408, camera controller 412, display 416, and I/O components 418 may be coupled to one another in various arrangements. For example, processor 406, memory 408, camera controller 412, display 416, and/or I/O components 418 may be coupled to each other via one or more local buses (not shown for simplicity).

Display 416 may be any suitable display or screen allowing for user interaction and/or to present items (such as captured images and/or videos) for viewing by the user. In some aspects, display 416 may be a touch-sensitive display. Display 416 may be part of or external to device 400. Display 416 may comprise an LCD, LED, OLED, or similar display. I/O components 418 may be or may include any suitable mechanism or interface to receive input (such as commands) from the user and to provide output to the user. For example, I/O components 418 may include (but are not limited to) a graphical user interface, keyboard, mouse, microphone and speakers, and so on.

Camera controller 412 may include an image signal processor 414, which may be (or may include) one or more image signal processors to process captured image frames or videos provided by camera 402. For example, image signal processor 414 may be configured to perform various processing operations for the generation of panning frames (e.g., motion blur simulation) that are described herein. Examples of image processing operations include, but are not limited to, cropping, scaling (e.g., to a different resolution), image stitching, image format conversion, color interpolation, image interpolation, color processing, image filtering (e.g., spatial image filtering), and/or the like.

In some example implementations, camera controller 412 (such as the image signal processor 414) may implement various functionality, including imaging processing and/or control operation of camera 402. In some aspects, image signal processor 414 may execute instructions from a memory (such as instructions 410 stored in memory 408 or instructions stored in a separate memory coupled to image signal processor 414) to control image processing and/or operation of camera 402. In other aspects, image signal processor 414 may include specific hardware to control image processing and/or operation of camera 402. Image signal processor 414 may alternatively or additionally include a combination of specific hardware and the ability to execute software instructions.

Figure 5:
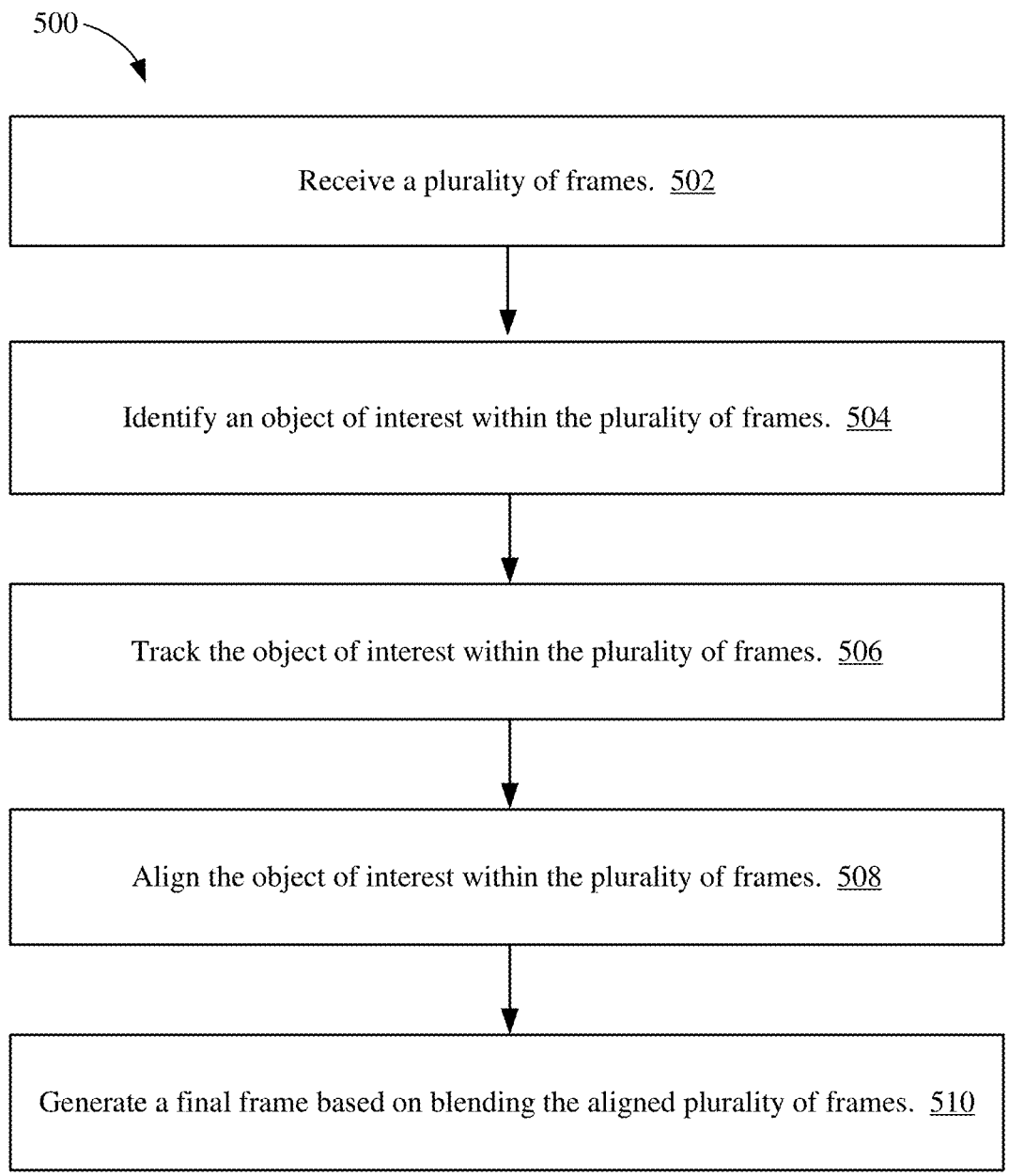
FIG. 5 is a flow chart illustrating an example operation for simulating motion blur.

FIG. 5 is an illustrative flow chart depicting an example of a method 500 for generating an image with simulated motion blur using a plurality of frames (e.g., images). Method 500 may be stored as instructions 410 within memory 408 of FIG. 4. Method 500 may be executed by one or more processors of FIG. 4.

At block 502, method 500 may receive a plurality of frames. The plurality of frames may include a video including a sequence of frames (e.g., images). The plurality of frames may include at least a first frame (an initial frame) and a second frame. Additional frames may be included within the plurality of frames (e.g., 5 frames, 10 frames, 30 frames, 60 frames, etc.). The plurality of frames may be captured via camera 402 of FIG. 4 in or near real-time. The plurality of frames may be stored in memory (e.g., memory 408 of FIG. 4 or external memory). The plurality of frames may be received directly from the camera (e.g., camera 402) or from memory (e.g., external memory, buffer memory, memory 408, and/or the like).

Figure 6A:
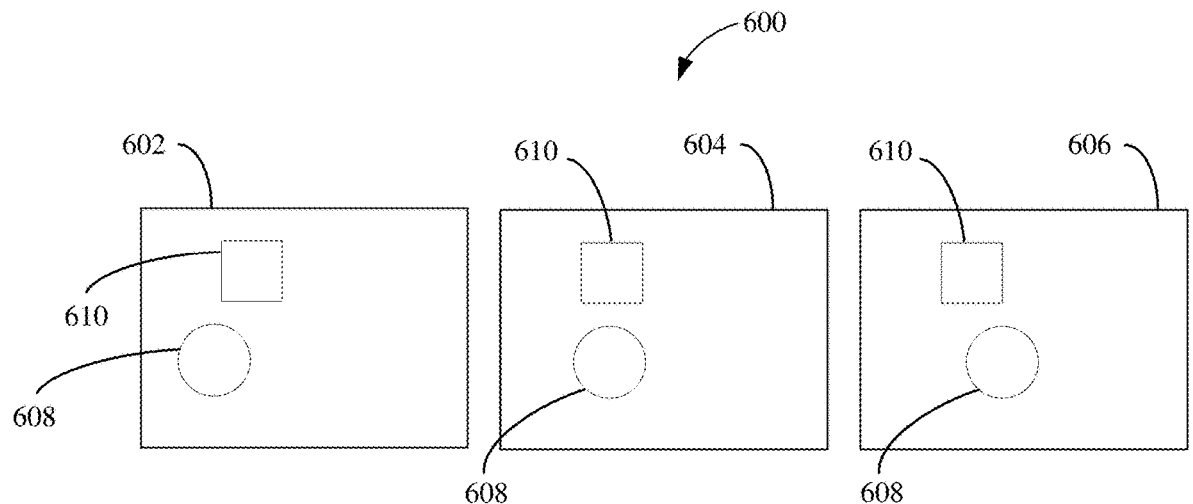
FIG. 6A is a block diagram illustrating a plurality of frames including objects.

The plurality of frames may depict a FOV. The plurality of frames depicting the FOV may include one or more objects (e.g., the one or more objects were present in the FOV at the time the camera captured the FOV). For example, FIG. 6A depicts a plurality of frames 600 including at least a first frame 602, a second frame 604, and a third frame 606. This is not meant to be a limitation of this disclosure, as more or less frames may be included within plurality of frames 600. For example, the plurality of frames may include as few as two frames. As shown in FIG. 6A, each of the plurality of frames 600 may include objects 608 and 610. As shown, the position of object 608 appears to move within each of the plurality of frames 600. For example, object 608 is shown below and slightly to the left of object 610 in first frame 602. In second frame 604, object 608 is located almost directly below object 610. In third frame 606, object 608 is located below and slightly to the right of object 610.

Referring back to FIG. 5, at block 504, method 500 may identify an object of interest within the plurality of frames. Identifying the object of interest may include identifying one or more objects of interest within the plurality of frames. Identifying the object of interest may include automatically identifying (e.g., receiving, selecting, etc.) the object of interest via the device (e.g., device 400 of FIG. 4) and/or receiving a user selection of the object of interest. Identifying the object of interest may include identifying the entire object within one or more frames or identifying a portion of the object within one or more frames. The object of interest may include a person, an animal, a car, a ball, and/or any other object.

Automatically identifying the object of interest via the device (e.g., device 400) may include processing the plurality of frames to identify an object depicted in the frames that satisfies one or more criteria. The criteria may include, but is not limited to, being in focus across a number of frames of the plurality of frames, being of a certain shape, size, and/or color, being in a certain region of one of the frames (e.g., near a border or edge of the first frame), featuring a particular mark, being in a foreground or background of one or more of the plurality of frames, moving position within a number of the plurality of frames, and/or the like. Automatically identifying the object of interest via the device (e.g., device 400) may include using an object detection algorithm. Any object detection algorithm may be used to identify and/or detect the object of interest.

Receiving a user selection of the object of interest may include receiving a manual selection identifying the object of interest based on a user input. For example, one or more of the plurality of frames may be displayed and a user may use an input device (e.g., a touchscreen, mouse, etc.) to identify (e.g., select) the object of interest within the plurality of frames.

Identifying the object of interest within the plurality of frames may include identifying the object of interest during capture of the plurality of frames or during playback of the plurality of frames. In some embodiments, identifying the object of interest within the plurality of frames may include identifying the object of interest within a single frame of the plurality of frames (e.g., a still frame, a frame of a paused video, a single frame of the video, etc.). The identified (e.g., selected) object of interest may be stored as metadata associated with the plurality of frames.

More than one object may be identified as the object of interest. However, in order to simulate motion blur with two or more identified objects of interest appearing sharp in a final generated frame, the two or more identified objects may be traveling as the same or similar speed. If they are not traveling at the same or similar speed, only one of the objects of interest may appear sharp in the final generated frame while the other may appear blurred.

Referring back to FIG. 6A, any of objects 608 and/or 610 may be identified as an object of interest, either automatically or manually, as described above. The object of interest may be identified in any one or more of plurality of frames 600 (e.g., first frame 602, second frame 604, third frame 606, and so on).

Referring back to FIG. 5, at block 506, method 500 may track the object of interest within the plurality of frames. Tracking the object of interest within the plurality of frames may include determining motion of the object of interest within the plurality of frames. Any known tracking algorithm may be used to track the object of interest within the plurality of frames. As discussed further below, determining motion of the object of interest within the plurality of frames may include determining whether the motion of the object of interest within the plurality of frames includes one or more of translational motion and non-translational motion.

Motion of the object of interest may be determined based on an analysis of the differences between different frames of the plurality of frames. For example, the difference in the position of the object of interest in the first frame (or any other frame) and the second frame (or any other frame) of the plurality of frames. In some embodiments, motion of the object of interest may be determined based on determining motion of features (e.g., corners, etc.) of the object of interest.

Motion of the object of interest may include motion data associated with the object of interest. Motion data associated with the object of interest may include a direction value and a magnitude value. The direction value may designate a direction of movement of the object of interest between the first frame and the second frame (or any other frame) of the plurality of frames. The magnitude value may represent the amount of movement of the object of interest between the first frame and the second frame (or any other frame) of the plurality of frames.

The object of interest may be surrounded by a bounding box (e.g., via the tracking algorithm and/or the object detection algorithm). The bounding box may be determined based on the motion of the object of interest within the plurality of frames. The entire object of interest may be surrounded by the bounding box or a portion of the object of interest may be surrounded by the bounding box. If a portion of the object of interest is surrounded by the bounding box, then the same portion of the object of interest should be surrounded by the bounding box throughout the plurality of frame. The bounding box includes the portion(s) of the object of interest that will remain sharp upon generation of the panning image.

The bounding box may or may not be displayed, via a display, to the user. Displaying the bounding box, via a display, to the user may allow the user to adjust the bounding box. For example, the user may adjust the bounding box such that portion(s) of the object of interest that the user would like to keep sharp within the generated panning image are included within the bounding box.

Figure 6B:
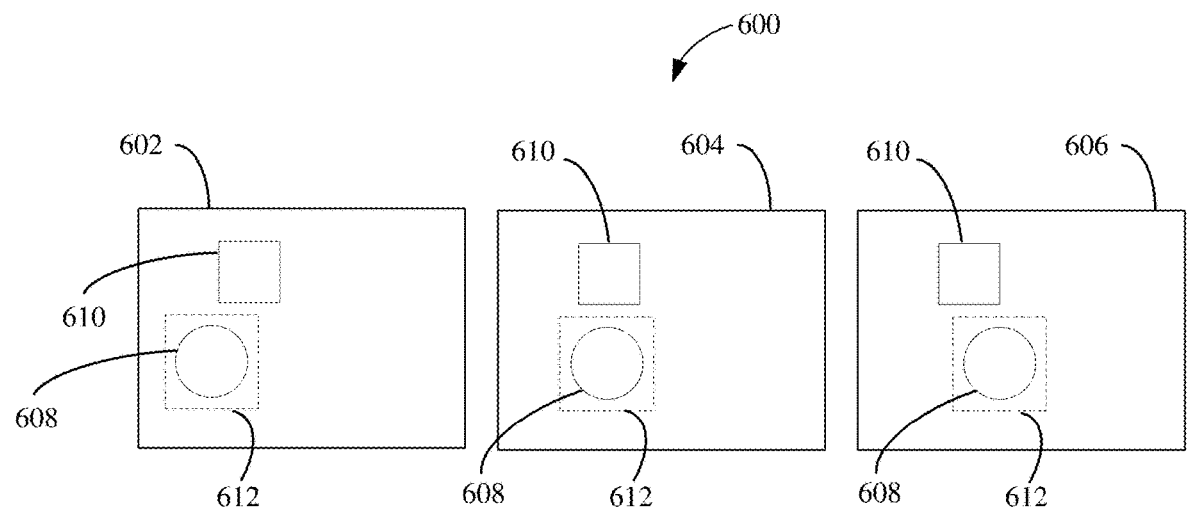
FIG. 6B is a block diagram illustrating the plurality of frames of FIG. 6A with an object of interest identified and tracked.

For example and referring to FIG. 6B, bounding box 612 is shown to surround object 608. Bounding box 612 is shown to indicate that object 608 has been identified as the object of interest and that object 608 has been tracked within each of the plurality of frames 600. For example, as object 608 moves within each frame (e.g., first frame 602, second frame 604, third frame 606, etc.), bounding box 612 may be used to track the movement of object 608 (e.g., based on the motion of object 608) within each frame and surround object 608 within each frame.

If bounding box 612 is displayed, via a display, the user may manually change/edit the bounding box. For example, if the user only wants the top half of object 608 to appear sharp in the generated panning image, then the user may manually manipulate (e.g., change, edit, select, etc.) the bounding box via a user input (e.g., touchscreen, mouse, etc.) to include only the top half of object 608 within the bounding box (e.g., bounding box 612). As such, device 400 of FIG. 4 may receive the manual selection of the bounding box (e.g., bounding box 612) from the user.

Referring back to FIG. 5, at block 508, method 500 may align the object of interest within the plurality of frames. Aligning the object of interest within the plurality of frames may include aligning the object of interest such that the object of interest is in the same location within each of the plurality of frames. Aligning the object of interest within the plurality of frames may include aligning the bounding box surrounding the object of interest such that the bounding box is in the same location within each of the plurality of frames.

Figure 6C:
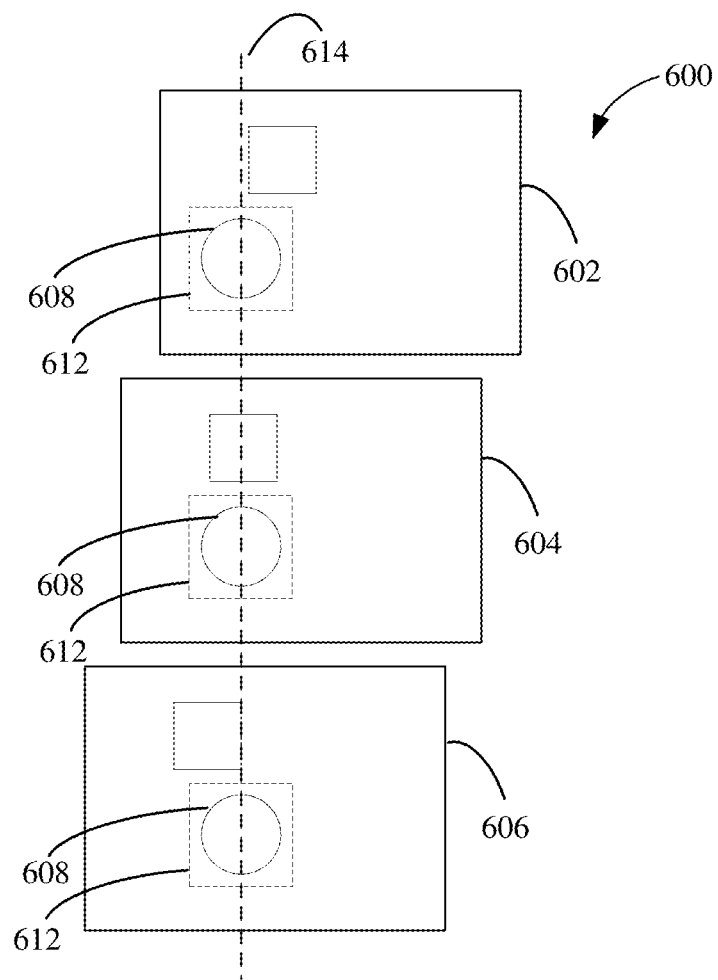
FIG. 6C is a block diagram illustrating alignment of the plurality of frames of FIG. 6B.

Referring to FIG. 6C, plurality of frames 600 is shown in a vertical arrangement for ease of illustration. As shown in FIG. 6C, object of interest 608 within each frame 602, 604, 606 may be aligned along a common axis 614. That is, bounding box 612 surrounding object of interest 608 within each frame 602, 604, 606 may be aligned along a common axis 614. Common axis 614 is shown for ease of illustration and is not meant to be a limitation of this disclosure. For example, aligning the object of interest (e.g., object 608) may include aligning corners of the bounding box (e.g., bounding box 612) within each of plurality of frames 600. Any suitable means of alignment may be used such that the object of interest (e.g., object of interest 608) and/or the bounding box (e.g., bounding box 612) including the object of interest (e.g., object 608) is located in the same location within each frame.

Alignment of the object of interest within the plurality of frames may be based upon whether the motion of the object of interest within the plurality of frames includes one or more of translational motion and non-translational motion. For example, if the motion of the object of interest within some or all of the plurality of frames includes translational motion, aligning the object of interest within the plurality of frames may include shifting one or more frames based on the motion of the object of interest. Shifting may refer to mapping each pixel at each location of one frame to another pixel of another frame at a different location.

For example, as shown in FIG. 6C, second frame 604 and third frame 606 may be shifted to the left relative to first frame 602 in order to align object of interest 608 (e.g., align bounding box 612) along common axis 614. This may be an example of the motion of object of interest 608 including translational motion because object of interest 608 may simply be moving from left to right in plurality of frames 600. Translational motion may include the object of interest moving across the plurality of frames from one point to another. In order to align bounding box 612 within each frame 602, 604, 606, pixels within at least second frame 604 and/or third frame 606 may be at locations offset from locations within first frame 602. The offset may be based on the magnitude and direction of the motion data and/or by the amount offset based on alignment of the object of interest (e.g., 608) and/or the bounding box (e.g., bounding box 612). For example, the offset between two frames may be 10 pixels, meaning one of the two frames (or both) may be shifted by 10 pixels based on the magnitude and direction of the motion data. In another example, the offset between another two frames may be 14 pixels, meaning one of the two frames (or both) may be shifted by 14 pixels based on the magnitude and direction of the motion data.

The motion of the object of interest within the plurality of frames may include non-translational motion. For example, non-translational motion may include the object of interest moving toward or away from the camera, such that the object of interest may appear larger or smaller in one of the plurality of frames relative to another frame, or zooming in and/or out with the camera itself. Other examples of non-translational motion may include, but is not limited to, rotation motion (e.g., the object of interest is rotating and/or the camera is rotating), affine motion, etc. Aligning the object of interest within the plurality of frames may be based on the type of non-translational motion of the object of interest. For example, an affine transformation or a homography transformation may be used to warp the frame to align the object of interest. Similarly, the bounding box may undergo a similar transformation to compensate for the non-translational motion of the object of interest. If the motion of the object of interest includes translation motion and non-translational motion, a combination of shifting and/or transformations may be applied to one or more of the frames and/or one or more of the bounding boxes within the frames.

As shown in FIG. 6C, now that object of interest 608 and/or bounding box 612 have been aligned within each of plurality of frames 600, portions of each of plurality of frames 600 appear to overlap while portions of each of plurality of frames 600 do not appear to overlap. In these cases, some of the non-overlapping edges of the plurality of frames (e.g., plurality of frames 600) may be filled in with pixel values from the last row or column of existing pixels. For example, if the shift is 10 pixels, the last existing pixel along the edge may be repeated for 10 pixels.

In some aspects, after one or more frames of the plurality of frames have been shifted (which may be referred to as the "aligned plurality of frames") based on alignment of the object of interest and/or the bounding box surrounding the object of interest, one or more new frames may be generated based on frame interpolation of the aligned plurality of frames. For example, given a first frame and a second frame that have been aligned, a new third frame may be generated between the first frame and the second frame based on frame interpolation. Any number of new frames may be generated between the first frame and the second frame. For example, three new frames may be generated between the first frame and the second frame. If five frames are currently included within the aligned plurality of frames, then frame interpolation may increase the number of frames to twenty-five (25) frames. This is for exemplary purposes only and is not meant to be a limitation of this disclosure. The frame interpolation may increase the number of frames included in the aligned plurality of frames to any desirable number of frames such that the frame rate of the captured plurality of frames (e.g., the frame rate of the video) may increase. Generating the new frames via interpolation based on the aligned plurality of frames means that the new frames may be generated with the object of interest aligned with the aligned plurality of frames. As will be discussed below, the new generated frames may allow for realistic simulation of a continuous frame (e.g., the final frame or image) with a long exposure time using the plurality of frames.

There is no particular limitation to what method may be used in generating the new (e.g., additional) frames, and so any method of interpolating the new frames may be used. For example, a frame interpolation algorithm and/or a motion compensated frame rate conversion (FRC) algorithm may be used to interpolate frames, but this is not meant to be a limitation of this disclosure. While any frame interpolation and/or FRC algorithm may be used, the frame interpolation and/or FRC algorithm may impact the quality of the final generated frame. For example, an algorithm that can detect and handle occlusion areas correctly, preserve boundaries of the object of interest, and/or can handle repeated patterns and/or small objects may result in a higher quality final frame than an algorithm that may generate interpolation artifacts.

An example frame interpolation algorithm may include motion estimation, motion vector processing, and motion compensation. Motion estimation may include generating motion vectors (e.g., forward motion vectors from the first frame to the second frame and/or backward motion vectors from the second frame to the first frame). Motion vector processing may include projecting the motion vectors to an interpolation time point between the first frame and the second frame. Motion compensation may include generating the interpolated frame (e.g., the third frame between the first frame and the second frame) at the interpolation time point based on the projected motion vectors.

Motion estimation may include generating motion vectors (e.g., forward motion vectors from the first frame to the second frame and/or backward motion vectors from the second frame to the first frame). For ease of description, generating forward motion vectors will be discussed, but the same process may apply for generating backward motion vectors. Motion estimation may take two input frames (e.g., a first frame at time t−1 and a second frame at time t+1) and generate motion vectors for each block within the first frame. For purposes of this description, the input frames may the aligned plurality of frames. The first frame may be divided into blocks (e.g., 8×8 pixel blocks, 16×16 pixel blocks, 32×32 pixel blocks, etc.). For each block in the first frame, the second frame is searched for a corresponding block that matches the block from the first frame.

A matching error may be determined based on the block from the first frame and the corresponding matching block in the second frame. The motion vector that corresponds to the lowest matching error may be selected as the motion vector for a particular block. For example, the ideal matching error may be zero, indicating a perfect or near perfect match, but may not always be possible. Different metrics may be used to determine the matching error. For example, the sum of absolute differences (e.g., the differences between each pixel in the block in the first frame and each corresponding pixel in the corresponding block in the second frame may be calculated and added together) plus a smoothness cost may be used as the matching error, but any means for determining the matching error may be used. The smoothness cost may be the difference between motion vectors of the neighboring blocks. In some aspects, to provide further smoothness, motion estimation may be performed in multiple resolutions of the frames. The total smoothness cost may be based on the difference between motion vectors across the multiple resolutions.

Forward motion vectors and backward motion vectors may be generated in a similar manner. For example, backward motion vectors may be generated using blocks from the second frame (e.g., the second frame at time t+1) to find corresponding matching blocks in the first frame (e.g., the first frame at time t−1).

Motion vector processing may include processing the generated motion vectors in order to determine a final motion vector for a particular block. Motion vector processing may include identifying outlier motion vectors. For example, outlier motion vectors may exist if a forward motion vector and a corresponding backward motion vector do not match. If outlier motion vectors exist, motion vector processing may include correcting the outlier motion vectors based on neighboring motion vectors. For example, inlier motion vectors of neighboring motion vectors may be median filtered (e.g., a median motion vector of the neighboring inlier motion vectors may be identified) or an additional search may be performed using the neighboring inlier motion vectors. A final motion vector may be determined for each block.

Upon determination of the final motion vectors for the blocks, motion vector processing may include projecting the final motion vectors to an interpolation time point (e.g., time t, between the first frame at time t−1 and the second frame at time t+1). Any gaps and/or overlaps in the motion vector field at the interpolation time point may be corrected by median filtering neighboring inlier motion vectors and/or performing additional searches using neighboring inlier motion vectors.

Motion vector processing may include identifying areas including occlusion and cover and/or uncover information for each block. For example, divergence and/or inconsistencies between the forward motion vector and the backward motion vector for a given block may be identified. In another example, inconsistencies between neighboring motion vectors may be identified. Occlusion and cover and/or uncover information may be used to determine how a block and/or pixels should be handled in the new generated frame if the object of interest is in a different location in the second frame from the first frame, because the background behind the object of interest may be exposed in the new generated frame based on the movement of the object of interest. In some aspects, a segmentation algorithm may be used where neighboring motion vectors from similar blocks of an occluded block and/or occluded area may be used as motion vectors for the occluded block and/or occluded areas.

Motion compensation may include generating one or more new frames based on frame interpolation of the aligned plurality of frames. For example, one or more new frames may be generated at different interpolation time points based on the final motion vectors and areas including occlusion and cover and/or uncover information for each block. For covered pixels/blocks in the new frame, pixels from a previous frame (e.g., the first frame) may be used for that particular block. For uncovered pixels/blocks in the new frame, pixels from a future frame (e.g., the second frame) may be used for that particular block. For all other blocks in the new frame, an average of the pixels of the blocks from the first frame and the second frame may be used.

Motion compensation may include using overlapped block motion compensation to generate the new frame. Overlapped block motion compensation may include fetching a motion vector associated with a block and the motion vectors associated with its neighbors from one of the two input frames (e.g., the first frame or the second frame) such that in most cases, nine motion vectors are fetched (e.g., the motion vector associated with the block and eight motion vectors associated with the block's eight neighboring blocks). The motion vector of the output block (e.g., the motion compensated block) may include a weighted average of the nine motion vectors. The weights may range for different pixels of the block in order to ensure a smooth transition between blocks with no blocking artifacts. The motion compensated block may be determined for forward motion vectors and backward motion vectors and they may be blended together based on cover and/or uncover information to generate an output motion compensation block.

Figure 7A:
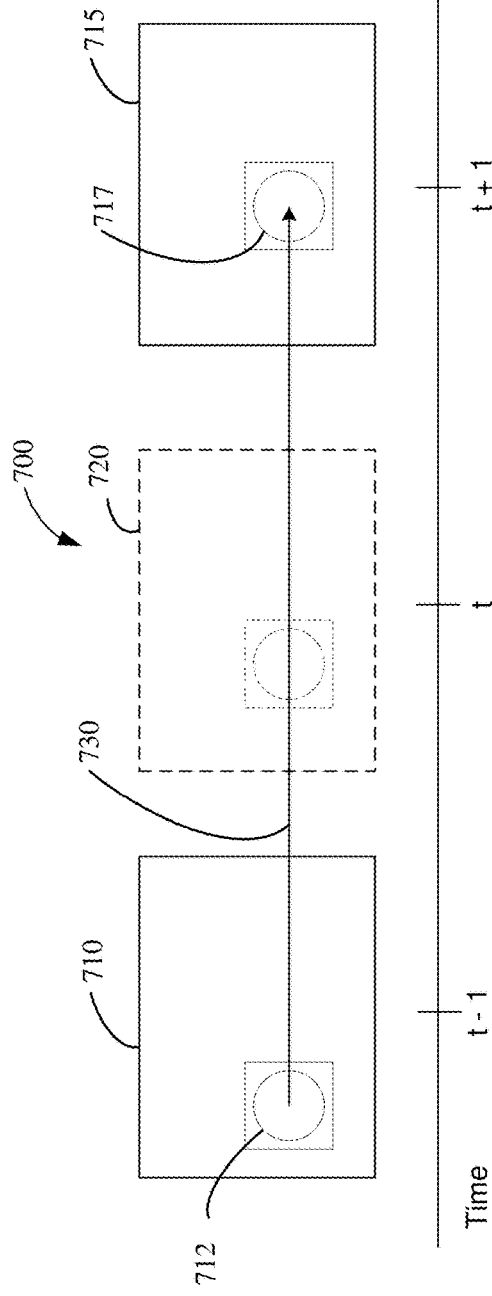
FIGS. 7A and 7B are block diagrams of one or more new generated frames based on frame interpolation.

FIG. 7A illustrates a block diagram of a new generated frame based on frame interpolation of the aligned plurality of frames between a first frame and a second frame. Plurality of frames 700 may include first frame 710 at time t−1 and second frame 715 at time t+1. First frame 710 may include block 712 including the object of interest and second frame 715 may include block 717 including the object of interest. Second frame 715 may be searched for a block (e.g., block 717) similar to block 712 of first frame 710. Motion vector 730 may be predicted (e.g., estimated, determined, etc.) based on the results of the search. Although forward motion vector 730 is generated in this example, that is for exemplary purposes only. A backward motion vector may be generated by performing motion estimation from second frame 715 to first frame 710. Third frame 720 may be generated between first frame 710 and second frame 715 based on motion vector 730 (e.g., motion vector 730 predicting the location of block 712 including the object of interest within third frame 720 at time t). Block 712 and/or block 717 including all of the object of interest is for illustrative purposes only. Block 712 and/or block 717 may include only a portion of the object of interest.

Figure 7B:
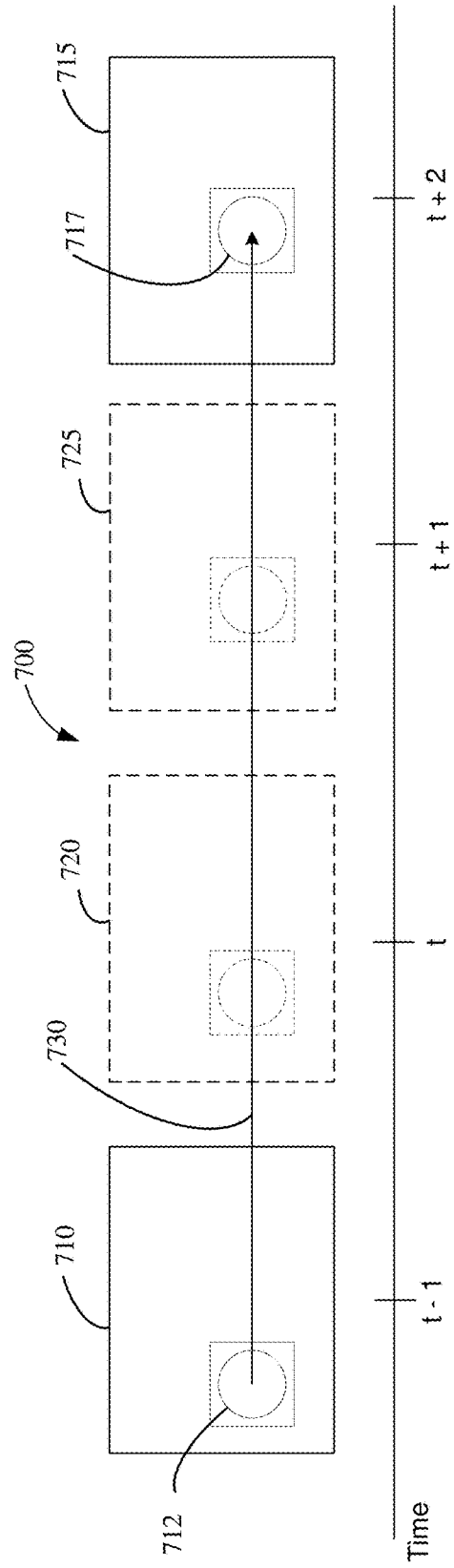

FIG. 7B illustrates a block diagram of a plurality of generated frames based on frame interpolation of the aligned plurality of frames between a first frame and a second frame. Plurality of frames 700 may include first frame 710 at time t−1 and second frame 715 at time t+2. First frame 710 may include block 712 including the object of interest and second frame 715 may include block 717 including the object of interest. Second frame 715 may be searched for a block (e.g., block 717) similar to block 712 of first frame 710. Motion vector 730 may be predicted (e.g., estimated, determined, etc.) based on the results of the search. Although forward motion vector 730 is generated in this example, that is for exemplary purposes only. A backward motion vector may be generated by performing motion prediction from second frame 715 to first frame 710. Third frame 720 and fourth frame 725 may be generated between first frame 710 and second frame 715 based on motion vector 730 (e.g., motion vector 730 predicting the location of block 712 including the object of interest within third frame 720 at time t and within fourth frame 725 at time t+1). In this manner, more than one frame may be generated between existing aligned frames. FIGS. 7A and 7B are meant to illustrate a general overview of new frame generation and is not meant to be a limitation of this disclosure.

Referring back to FIG. 5, at block 510, method 500 may generate a final frame by blending the aligned plurality of frames. Blending the aligned plurality of frames may include averaging corresponding pixel values of the aligned plurality of frames. For example, the pixel values at a particular location within each of the aligned plurality of frames may be added together and divided by the number of frames to determine the average pixel value for that location within the final generated frame. A weighted average may be used to generate the final frame.

Generating an image by blending the aligned plurality of frames may include blending the new frames and the aligned plurality of frames. Blending the new frames (e.g., generated via interpolation) and the aligned plurality of frames may include averaging corresponding pixel values of the aligned plurality of frames and the new frames. For example, the pixel values at a particular location within each of the aligned plurality of frames and the new frames may be added together and divided by the number of frames (e.g., the number of aligned frames and the number of new frames) to determine the average pixel value for that location within the final generated image. A weighted average may be used to generate the final image.

Blending (e.g., averaging) the plurality of frames, including the new generated frames, allows for simulation of a long exposure time. A long exposure time is often required for capturing motion blur images and/or frames. However, generating a realistic looking motion blur image without the long exposure time may require a relatively high frame rate. Frame interpolation may allow generating a high frame rate video from the original captured frames (e.g., video) and blending the frames of the generated high frame rate video to generate a realistic looking motion blur frame (e.g., image).

Since the object of interest, or at least a portion of the object of interest, has been aligned within the plurality of frames (and the new frames since the new frames are generated based on the aligned plurality of frames), the object of interest, or the aligned portion of the object of interest, may look sharp in the final frame after blending. Alternatively, other areas of the image (e.g., background, areas around the object of interest, etc.) may appear blurred after blending due to having shifted the frames to align them. The blurred background may give the appearance of a motion blur photograph (e.g., a panning image or panning frame). In this manner, a user does not have to pan the camera to match the speed of the moving object and/or use a long exposure time. In this manner, a user may capture frames of the moving object and recreate a motion blur photograph without having to move the camera and match the speed of the moving object.

In some embodiments, a user interface may be displayed, via a display (e.g., display 416 of FIG. 4), including a user selectable motion blur range to allow a user to select an amount of motion blur to simulate. In such embodiments, the user may select the amount of motion blur to apply to the final image. As such, the device (e.g., device 400 of FIG. 4) may receive a selection of the amount of motion blur to simulate.

Figure 8:
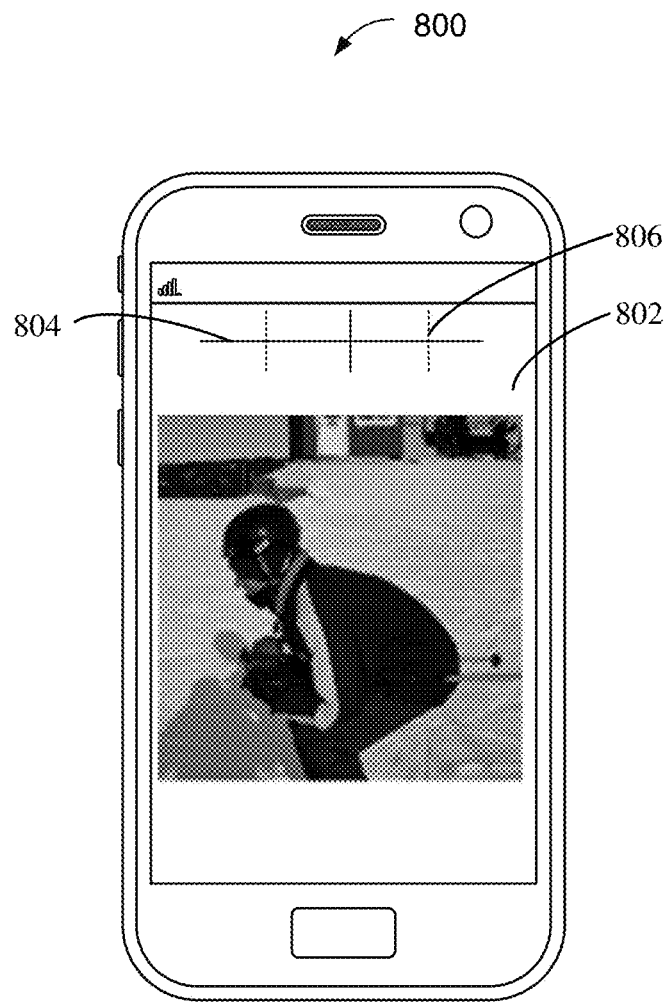
FIG. 8 depicts an example device displaying a user interface.

FIG. 8 is a diagram illustrating an exemplary user interface via a mobile device 800. As shown in FIG. 8, a skier is captured skiing (e.g., similar to FIG. 1). As shown via display 802, a user selectable motion blur range 804 is displayed. A user may slide a bar 806 in different directions (e.g., left and/or right in the example shown in FIG. 8) to increase or decrease the amount of motion blur to simulate. As shown in FIG. 8, user selectable motion blur range 804 is shown to be displayed above the displayed frame, but that is not meant to be a limitation of this disclosure. User selectable motion blur range 804 may be overlaid over the frame. Further, while user selectable motion blur range 804 is shown as a bar extending horizontally, that is not meant to a limitation of this disclosure. For example, user selectable motion blur range 804 may extend vertically, it may be a numerical range (e.g., the user may select from 0-5), etc. User selectable motion blur range 804 may be displayed during capture of the plurality of frames (e.g., a video) and/or may be displayed post-capture while viewing the captured frames and/or video. The final frame (e.g., with simulated motion blur based on blending) may be displayed via display 802.

While generating a panning frame (e.g., generating a frame including simulated motion blur from aligned frames) have been discussed thus far, in some embodiments, a video may be generated with simulated motion blur. For example, the video (e.g., a final video) may be generated by generating a plurality of successive final frames with the simulated motion blur.

Figure 9A:
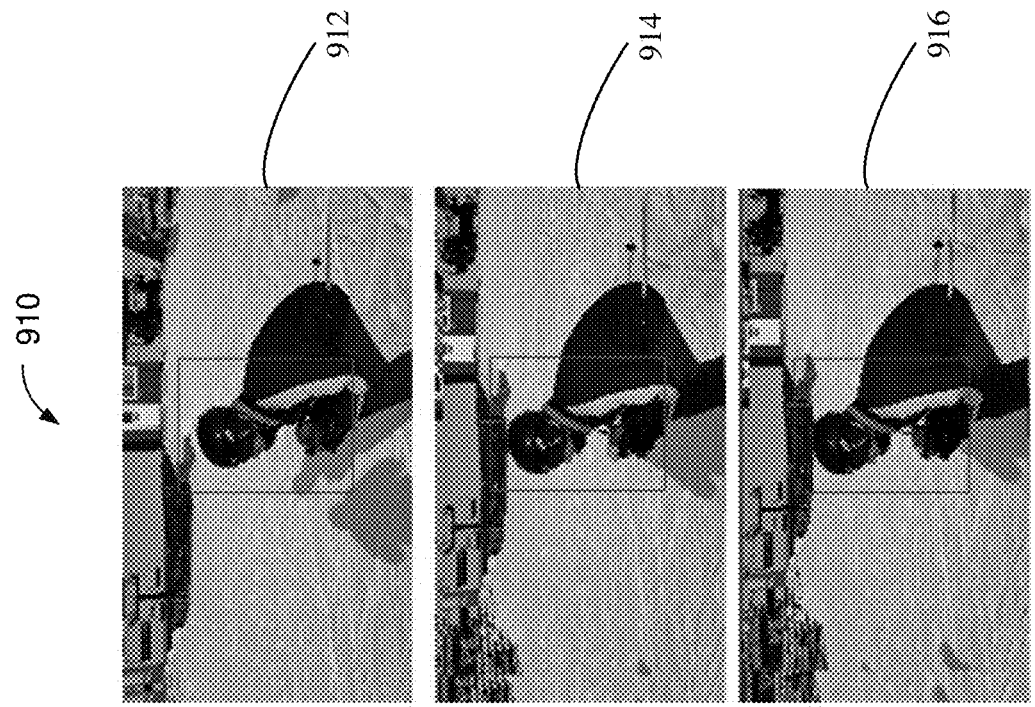
FIG. 9A is an illustration depicting a plurality of frames with a tracked object of interest.
Figure 9B:
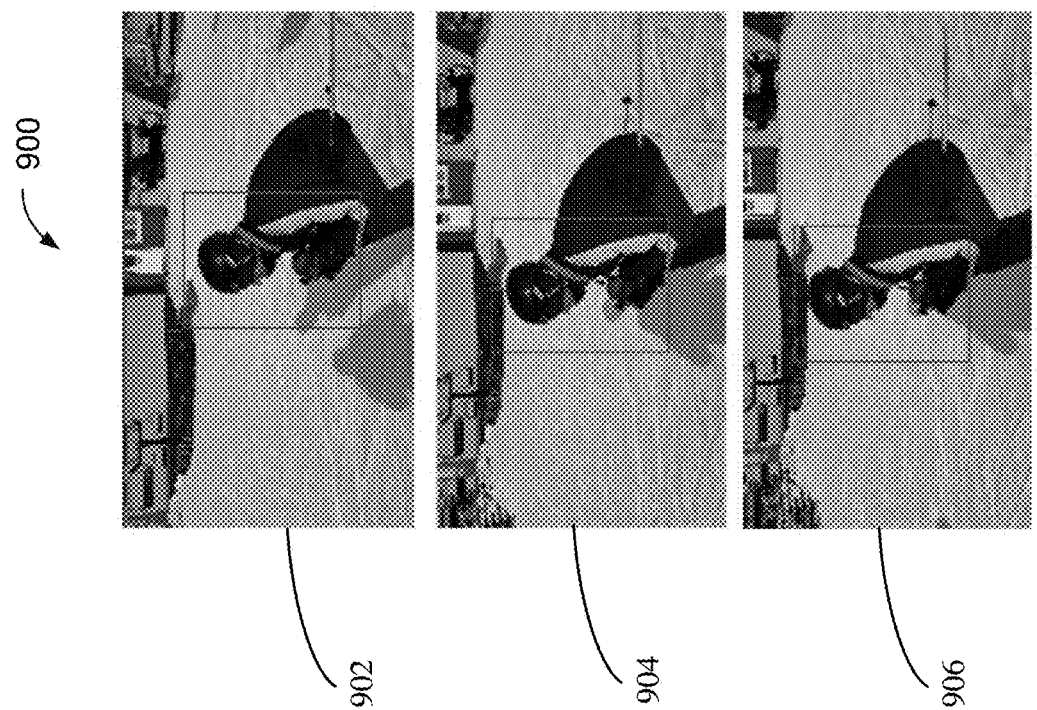
FIG. 9B is an illustration depicting an aligned plurality of frames based on the tracked object of interest of FIG. 9A.

FIG. 9A illustrates exemplary captured frames. FIG. 9B illustrates the captured frames of FIG. 9A after alignment. As shown in FIG. 9A, three frames are shown with a skier including first frame 902, second frame 904, and third frame 906. A box (e.g., a bounding box via a tracking algorithm) is illustrated around the skier's head and hands, indicating that the object of interest includes the skier, and more specifically, the tracked object of interest includes the skier's head and hands. As illustrated in FIG. 9A via the bounding box, the skier appears to be moving from right to left from first frame 902 to second frame 904 and from second frame 904 to third frame 906. As discussed based on the embodiment, the bounding box may or may not be displayed. Similarly, more frames may be included in plurality of frames 900 and aligned plurality of frames 910 than are illustrated in FIGS. 9A and 9B. As such, only a subset of the total number of frames are shown for illustration purposes.

Since the object of interest (e.g., the skier's head and hands) has been tracked, as shown via the bounding boxes of FIG. 9A, FIG. 9B illustrates aligned plurality of frames 910 based on aligning the object of interest. That is, the bounding boxes in aligned frames 912, 914, 916 appear to be aligned via a common axis. Alternatively, the bounding boxes may be aligned based on corners of the bounding box being in the same location within each of plurality of frames 910. Other means for alignment may be contemplated. As can be seen along the left vertical edge of aligned frame 916, some pixels on the left side appear to be repeated (as discussed above), as shown by the repeated shadow in the snow. This is due to shifting the frame to the right based on the motion of the object of interest (e.g., the skier's head and hands) from frame 904 to frame 906 in order to align the frames.

Figure 10A:
FIG. 10A is an illustration depicting a generated frame based on blending the plurality of frames of FIG. 9A.
Figure 10B:
FIG. 10B is an illustration depicting a generated frame based on blending the aligned plurality of frames of FIG. 9B.

FIG. 10A illustrates a generated frame by blending the plurality of frames prior to alignment (e.g., blending/averaging plurality of frames 900 of FIG. 9A). FIG. 10B illustrates a generated final frame by blending the plurality of frames after alignment (e.g., blending/averaging plurality of frames 910 of FIG. 9B). As shown in FIG. 10A, the skier is blurred along with the background. This is because the pixels have been blended/averaged with the object of interest in different locations of each of the frames 900. As shown in FIG. 10B, the skier's head and hands (e.g., the object of interest) appear sharp while other areas of the frame appear blurred. This is because the pixels have been blended/averaged with the object of interest in the same location within each of the frames 910.

Figure 11A:
FIG. 11A is an illustration depicting the aligned plurality of frames of FIG. 9B.
Figure 11B:
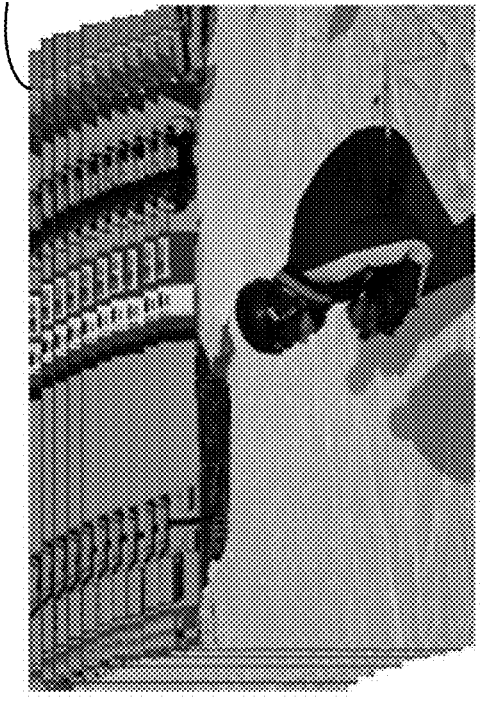
FIG. 11B is an illustration depicting a plurality of new generated frames based on frame interpolation of the aligned plurality of frames of FIG. 11A.
Figure 11C:
FIG. 11C is an illustration depicting a generated frame based on blending the aligned plurality of frames of FIG. 11A and the plurality of new generated frames of FIG. 11B.

FIG. 11A illustrates the aligned plurality of frames 910 of FIG. 9B. FIG. 11B illustrates new generated frames 1100 based on frame interpolation of aligned frames 910 of FIG. 11A. FIG. 11C illustrates the final generated frame based on blending aligned plurality of frames 910 of FIG. 11A and new generated frames 1100 of FIG. 11B.

Figure 12A:
FIGS. 12A and 12B depict a comparison between FIG. 10B and FIG. 11C.
Figure 12B:

FIGS. 12A and 12B illustrate a comparison of a generated final image based on blending the aligned plurality of frames 910 of FIG. 11A (e.g., FIG. 12A, similar to FIG. 10B) versus a generated final image based on blending the aligned plurality of frames 910 of FIG. 11A and the new generated frames 1100 of FIG. 11B (e.g., FIG. 12B). As shown, because more frames are used to generate the final frame of FIG. 12B than FIG. 12A (e.g., a higher frame rate is used to generate the final frame of FIG. 12B than FIG. 12A), the background of FIG. 12B appears to include more motion blur than that of FIG. 12A. Similarly, because fewer frames are used to generate the final frame of FIG. 12A than FIG. 12B (e.g., a lower frame rate is used to generate the final frame of FIG. 12A than FIG. 12B), the background of FIG. 12A appears to include less motion blur than that of FIG. 12B. That is, the motion blur in FIG. 12A does not appear as realistic as the motion blur of FIG. 12B. For example, 5 frames were blended to generate the final frame of FIG. 12A while 80 frames were blended to generate the final frame of FIG. 12B.

Figure 13A:
FIGS. 13A and 13B depict generated frames based on blending different numbers of frames.
Figure 13B:

FIG. 13A illustrates a final generated frame using 32 blended (e.g., averaged) frames. The final generated frame of FIG. 13A was generated by interpolating 15 frames between each pair of originally captured frames, thus increasing the frame rate of the original captured video by a factor of 16. FIG. 13B illustrates a final generated frame using 192 blended (e.g., averaged) frames. Similarly, the final generated frame of FIG. 13B was generated by interpolating 15 frames between each pair of originally captured frames, thus increasing the frame rate of the original captured video by a factor of 16. However, the frames captured and/or used to generate the final frame of FIG. 13B covered a longer time period compared to that of FIG. 13A, which resulted in more motion blur in FIG. 13B.

Certain aspects and embodiments of this disclosure have been provided above. Some of these aspects and embodiments may be applied independently and some of them may be applied in combination as would be apparent to those of skill in the art. In the foregoing description, for the purposes of explanation, specific details are set forth in order to provide a thorough understanding of embodiments of the invention. However, it will be apparent that various embodiments may be practiced without these specific details. The figures and description are not intended to be restrictive. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Moreover, the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Further, the various illustrative logical blocks, modules, circuits, and algorithm steps described in connection with the embodiments disclosed herein may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

As noted the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

While the present disclosure shows illustrative aspects, it should be noted that various changes and modifications could be made herein without departing from the scope of the appended claims. Additionally, the functions, steps or actions of the method claims in accordance with aspects described herein need not be performed in any particular order unless expressly stated otherwise. Furthermore, although elements may be described or claimed in the singular, the plural is contemplated unless limitation to the singular is explicitly stated. Accordingly, the disclosure is not limited to the illustrated examples, and any means for performing the functionality described herein are included in aspects of the disclosure.

What is claimed is:

1. A device, comprising:
a memory; and
a processor coupled to the memory, the processor configured to:
receive a plurality of frames;
identify an object of interest within the plurality of frames;
track the object of interest within the plurality of frames, wherein the object of interest is located in different locations in a first frame and a second frame of the plurality of frames;
align the object of interest within the plurality of frames; and generate a final frame including simulated motion blur based on blending the aligned plurality of frames.

2. The device of claim 1, wherein the processor is further configured to:
generate one or more additional frames based on frame interpolation of the aligned plurality of frames.

3. The device of claim 2, wherein generating the final frame including the simulated motion blur based on blending the aligned plurality of frames includes generating the final frame include the simulated motion blur based on blending the one or more additional frames and the aligned plurality of frames.

4. The device of claim 1, wherein tracking the object of interest within the plurality of frames includes determining motion of the object of interest within the plurality of frames.

5. The device of claim 4, wherein determining motion of the object of interest includes determining whether the motion of the object of interest includes one or more of translational motion and non-translational motion.

6. The device of claim 5, wherein aligning the object of interest within the plurality frames includes aligning one or more frames based on whether the motion of the object of interest includes one or more of translational motion and non-translational motion.

7. The device of claim 1, wherein aligning the object of interest within the plurality of frames includes aligning a bounding box surrounding the object of interest within the plurality of frames.

8. The device of claim 1, wherein the processor is further configured to:
display a user selectable motion blur range to allow a user to select an amount of motion blur to simulate.

9. The device of claim 8, wherein the processor is further configured to:
receive a selection of the amount of motion blur to simulate.

10. The device of claim 1, wherein the processor is further configured to:
generate a final video by generating a plurality of successive final frames.

11. A method, comprising:
receiving a plurality of frames;
identifying an object of interest within the plurality of frames;
tracking the object of interest within the plurality of frames, wherein the object of interest is located in different locations in a first frame and a second frame of the plurality of frames;
aligning the object of interest within the plurality of frames; and
generating a final frame including simulated motion blur based on blending the aligned plurality of frames.

12. The method of claim 11, further comprising:
generating one or more additional frames based on frame interpolation of the aligned plurality of frames.

13. The method of claim 12, wherein generating the final frame including the simulated motion blur based on blending the aligned plurality of frames generating the final frame including the simulated motion blur based on blending the one or more additional frames and the aligned plurality of frames.

14. The method of claim 11, wherein tracking the object of interest within the plurality of frames includes determining motion of the object of interest within the plurality of frames.

15. The method of claim 14, wherein determining motion of the object of interest includes determining whether the motion of the object of interest includes one or more of translational motion and non-translational motion.

16. The method of claim 15, wherein aligning the object of interest within the plurality frames includes aligning one or more frames based on whether the motion of the object of interest includes one or more of translational motion and non-translational motion.

17. The method of claim 11, wherein aligning the object of interest within the plurality of frames includes aligning a bounding box surrounding the object of interest within the plurality of frames.

18. The method of claim 11, further comprising:
displaying a user selectable motion blur range to allow a user to select an amount of motion blur to simulate.

19. The method of claim 18, further comprising:
receiving a selection of the amount of motion blur to simulate.

20. The method of claim 11, further comprising:
generating a final video by generating a plurality of successive final frames.

21. A non-transitory computer-readable storage medium storing instructions thereon that when executed cause one or more processors to:
receive a plurality of frames;
identify an object of interest within the plurality of frames;
track the object of interest within the plurality of frames, wherein the object of interest is located in different locations in a first frame and a second frame of the plurality of frames;
align the object of interest within the plurality of frames; and
generate a final frame including simulated motion blur based on blending the aligned plurality of frames.

22. The non-transitory computer-readable storage medium of claim 21, wherein execution of the instructions further causes the one or more processors to:
generate one or more additional frames based on frame interpolation of the aligned plurality of frames.

23. The non-transitory computer-readable storage medium of claim 22, wherein generating the final frame including the simulated motion blur based on blending the aligned plurality of frames includes generating the final frame including the simulated motion blur based on blending the one or more additional frames and the aligned plurality of frames.

24. The non-transitory computer-readable storage medium of claim 21, wherein tracking the object of interest within the plurality of frames includes determining motion of the object of interest within the plurality of frames.

25. The non-transitory computer-readable storage medium of claim 24, wherein aligning the object of interest within the plurality frames includes aligning one or more frames based on whether the determined motion of the object of interest includes one or more of translational motion and non-translational motion.

26. A device, comprising:
means for receiving a plurality of frames;
means for identifying an object of interest within the plurality of frames;
means for tracking the object of interest within the plurality of frames, wherein the object of interest is located in different locations in a first frame and a second frame of the plurality of frames;

means for aligning the object of interest within the plurality of frames; and means for generating a final frame including simulated motion blur based on blending the aligned plurality of frames.

27. The device of claim 26, further comprising:
means for generating one or more additional frames based on frame interpolation of the aligned plurality of frames.

28. The device of claim 27, wherein generating the final frame including the simulated motion blur based on blending the aligned plurality of frames includes generating the final frame including the simulated motion blur based on blending the one or more additional frames and the aligned plurality of frames.

29. The device of claim 26, wherein tracking the object of interest within the plurality of frames includes determining motion of the object of interest within the plurality of frames.

30. The device of claim 29, wherein aligning the object of interest within the plurality frames includes aligning one or more frames based on whether the determined motion of the object of interest includes one or more of translational motion and non-translational motion.

* * * * *